US011042880B1

(12) United States Patent
Hazan et al.

(10) Patent No.: US 11,042,880 B1
(45) Date of Patent: Jun. 22, 2021

(54) AUTHENTICATING USERS IN THE PRESENCE OF SMALL TRANSACTION VOLUMES

(71) Applicant: EMC Corporation, Hopkinton, MA (US)

(72) Inventors: Alon Hazan, Ramat Gan (IL); Anatoly Gendelev, Rechovot (IL); Marcelo Blatt, Modiin (IL); Alon Kaufman, Herut (IL); Alex Zaslavsky, Peteh Tiqwa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1367 days.

(21) Appl. No.: 14/573,213

(22) Filed: Dec. 17, 2014

(51) Int. Cl.
*G06Q 20/40* (2012.01)

(52) U.S. Cl.
CPC .................. *G06Q 20/4016* (2013.01)

(58) Field of Classification Search
None
See application file for complete search history.

(56) References Cited

U.S. PATENT DOCUMENTS

| | | | |
|---|---|---|---|
| 6,068,105 A | 5/2000 | Darwish et al. | |
| 7,403,922 B1* | 7/2008 | Lewis | G06Q 10/0635 705/38 |
| 7,409,357 B2* | 8/2008 | Schaf | G06Q 10/0635 705/7.28 |
| 7,865,427 B2 | 1/2011 | Wright et al. | |
| 7,908,645 B2 | 3/2011 | Varghese et al. | |
| 7,970,701 B2 | 6/2011 | Lewis et al. | |
| 8,019,678 B2 | 9/2011 | Wright et al. | |
| 8,370,389 B1* | 2/2013 | Dotan | G06F 21/43 707/781 |
| 8,452,980 B1* | 5/2013 | Black | G06F 21/554 713/185 |
| 8,478,688 B1* | 7/2013 | Villa | G06Q 40/02 705/35 |
| 8,549,595 B1 | 10/2013 | Vaisman et al. | |

(Continued)

OTHER PUBLICATIONS

The MathWorks, Statistics Toolbox, 2005, The MathWorks, Version 5, p. 2-76 (Year: 2005).*

(Continued)

*Primary Examiner* — John W Hayes
*Assistant Examiner* — Arastoo (Ari) Shahabi
(74) *Attorney, Agent, or Firm* — BainwoodHuang

(57) ABSTRACT

A method involves performing a mathematical estimation operation identifying a risk score threshold. The operation identifies the risk score threshold as a point on a curve rather than a value of a particular risk score. Such a curve approximates the distribution of risk score values output over a time interval and represents a function embodied by a plot of risk score percentile vs. risk score value. The risk engine, rather than selecting a particular risk score, selects a curve from a family of curves that is known to accurately represent such risk score distributions. For example, the risk engine may choose the curve that provides the best fit to the previous week's risk scores over the family of curves. The risk engine identifies the risk score threshold by finding a risk score value such that the function evaluated at that risk score value produces a specified risk score percentile.

12 Claims, 5 Drawing Sheets

(56) References Cited

U.S. PATENT DOCUMENTS

| | | | |
|---|---|---|---|
| 8,572,391 B2* | 10/2013 | Golan | G06F 21/40 |
| | | | 705/72 |
| 8,701,199 B1 | 4/2014 | Dotan et al. | |
| 8,776,190 B1* | 7/2014 | Cavage | G06F 21/33 |
| | | | 726/5 |
| 8,781,975 B2 | 7/2014 | Bennett et al. | |
| 8,832,790 B1 | 9/2014 | Villa et al. | |
| 8,973,096 B1 | 3/2015 | Villa et al. | |
| 9,160,742 B1 | 10/2015 | Ackerman et al. | |
| 9,239,908 B1 | 1/2016 | Constantine | |
| 9,338,187 B1 | 5/2016 | Oprea et al. | |
| 2002/0193162 A1* | 12/2002 | Walker | G07F 17/32 |
| | | | 463/42 |
| 2005/0065754 A1* | 3/2005 | Schaf | G06Q 10/0635 |
| | | | 702/188 |
| 2007/0150745 A1* | 6/2007 | Peirce | G06F 21/32 |
| | | | 713/186 |
| 2008/0195387 A1* | 8/2008 | Zigel | G10L 17/06 |
| | | | 704/236 |
| 2015/0026027 A1 | 1/2015 | Priess et al. | |

OTHER PUBLICATIONS

Babyak, Rescaling continuous predictors in regression models, 2009, Psychosomatic Medicine (Year: 2009).*
Geyer, Stat 5101 Lecture Notes, 2001, Geyer, pp. 115-116 (Year: 2001).*
Babyak, Statistical Tips from the Editors of Psychosomatic Medicine (Year: 2009).*
The Mathworks, Statistical Toolbox (Year: 2005).*
Babyak, Rescaling continuous predictors in regression models, Psychosomatic Medicine (Year: 2009).*
Geyer, Stat 5101 Lecture Notes (Year: 2001).*

* cited by examiner

AUTHENTICATING USERS IN THE PRESENCE OF SMALL TRANSACTION VOLUMES

BACKGROUND

Risk-based authentication involves evaluating multiple authentication factors to determine whether a human using a computer is authentic, i.e., not an imposter. In particular, a risk engine takes, as inputs, authentication factors such as username and password, time of day, IP address, and geo-location and outputs a risk score, i.e., a numerical value or measure indicating a likelihood that the human is an imposter.

If the risk score is less than a predetermined risk score threshold, authentication is considered successful, i.e., the human using the computer is considered to be authentic. However, if the risk score exceeds the predetermined risk score threshold, authentication is considered unsuccessful.

SUMMARY

Since humans may vary their behavior and fraudsters may vary their attack strategies over time, a process may be in place to routinely replace a previous risk score threshold with a new risk score threshold thus keeping the operation of the risk engine up to date. Along these lines, the process may update the risk score threshold periodically, for example a daily basis.

One approach to updating the risk score threshold involves ranking actual risk scores output over a prior time interval (e.g., the last seven days) based on risk score value, and then identifying a particular risk score from the ranked risk scores based on a policy. The risk engine then uses the value of the particular risk score as the new risk score threshold during the following day.

It should be understood that, after the end of that next day, the approach further involves updating the past week's risk scores, i.e., the risk engine adds the risk scores output over that next day to the past week's risk scores and deletes the earliest risk scores from the past week's risk scores. Such a daily updating of the past week's risk scores allows the risk score threshold to be updated on a daily basis.

For example, suppose that the policy requires using the particular risk score that is the top 0.5% (i.e., the $99.5^{th}$ percentile) of the past week's risk scores as the new risk score threshold during the following day. In such a situation, if there were 10,000 authentication attempts during the last week, the process would rank the risk scores from the 10,000 authentication attempts in order (i.e., lowest to highest) based on risk score value. The process would then identify the $9,950^{th}$ risk score in that ranking, and then configure the risk engine to use the value of that $9,950^{th}$ risk score as the new risk score threshold during the following day.

The above-described risk score threshold updating approach may work well when the application of the policy results in at least several failed authentication attempts each day. Along these lines, in the above-provided example of 10,000 authentication attempts over the past week, the number of authentication attempts is large enough to provide 50 authentication attempts over the past week that exceeded the identified risk score. Because the risk score values over the past week are a good predictor of the following day's risk scores, the expected number of failed authentication attempts during the following day is 50 divided by 7 days, or about 7.

However, if the policy remains the same but the sample size is smaller, the approach becomes more susceptible to anomalies. For example, suppose that there were only 100 authentication attempts during the last week. Applying the same policy results in ranking the 100 risk scores in order based on risk score value, and then selecting the top 0.5% risk score of the 100 risk scores. Here, the top 0.5% risk score is the absolute highest risk score output during the last week. Unfortunately, if the value of that risk score is unusually high (or low) but nevertheless used as the new risk score threshold, the operation of the risk engine for the next day may be significantly skewed, e.g., may provide too many false positives (e.g., unsuccessful authentication of legitimate users) or may provide too many false negatives (successful authentication of imposters).

An improvement to the above-described approach to updating the risk score threshold involves performing a mathematical estimation operation to identify a risk score threshold. Specifically, the mathematical estimation operation configures the risk engine to identify the risk score threshold as a point on a curve rather than a value of a particular risk score. Such a curve approximates the distribution of risk score values output over a time interval, e.g., a week, and represents a function embodied by a plot of risk score percentile vs. risk score value. The risk engine, rather than selecting a particular risk score, selects a curve from a family of curves that is known to accurately represent such risk score distributions. For example, the risk engine may choose the curve that provides the best fit to the previous week's risk scores over the family of curves. The risk engine identifies the risk score threshold by finding a risk score value such that the function evaluated at that risk score value produces a specified risk score percentile, e.g., the $99.5^{th}$ percentile.

Advantageously, the improvement provides robust authentication even when the number of risk scores collected over a period of time is small. For example, suppose that the number of risk scores computed over the previous week is 200 and the specified percentile is 99.5%. The improvement allows for the identification of a risk score threshold that is smaller than the largest risk score value because the risk score threshold is identified by a curve rather than a particular score. This identification provides robust authentication because it is insusceptible to anomalies. Further, because the curve accurately reflects risk score distributions in general, the risk score threshold precisely reflects an authentication policy's intention.

One embodiment of the improvement is directed to a method of performing authentication. The method includes collecting risk scores which are generated in response to authentication requests during a first period of time. The method also includes performing a mathematical estimation operation to derive a risk score threshold from the risk scores. The method further includes authenticating users based on the risk score threshold during a second period of time which is after the first period of time.

In some arrangements, authenticating the users includes receiving a first new authentication request in response to receipt of a request from a first user to access a first resource, receiving a second new authentication request in response to receipt of a request from a second user to access a second resource, each of the first new authentication request and the second new authentication request containing values of authentication factors, generating a first new risk score based on the values of the authentication factors of the first new authentication request and a second new risk score based on the values of the authentication factors of the second new authentication request, granting the first user access to the first resource in response to the first new risk score being less than the risk score threshold, and invoking an action prior to granting or denying the second user access to the second resource in response to the second new risk score being greater than the risk score threshold.

In some arrangements, performing the mathematical estimation operation includes performing a fitting operation using the risk scores as input, the fitting operation being configured to (i) simulate a standard distribution curve within a graphical plot of authentication request density versus risk score and (ii) identify a point along the standard distribution curve which represents a particular predefined authentication request percentile, and outputting a particular risk score coordinate of the identified point as the risk score threshold.

In some arrangements, the standard distribution curve represents a parametric distribution function of risk score having a set of parameters, and performing the fitting operation using the risk scores as input includes finding a particular value of each of the set of parameters from the risk scores.

In some arrangements, performing the fitting operation using the risk scores as input further includes rescaling the risk scores to produce rescaled risk scores, each of the rescaled risk scores being nonnegative, and finding the particular value of each of the set of parameters from the risk scores includes performing a maximum likelihood estimation of the set of parameters using the rescaled risk scores.

In some arrangements, rescaling the risk scores includes generating an interquartile range of the risk scores and dividing each of the risk scores by the interquartile range in order to avoid scaling the risk scores by outliers.

In some arrangements, the parametric distribution function of risk score is equal to a first distribution function of rescaled risk score when a rescaled risk score is less than a value of a cutoff parameter of the set of parameters and a second distribution function of rescaled risk score when the rescaled risk score is greater than the value of the cutoff parameter, the second distribution function representing a tail of a distribution of the rescaled risk scores, and performing the maximum likelihood estimation of the set of parameters using the rescaled risk scores includes generating a log-likelihood function of the set of parameters from the first distribution function, the second distribution function, and the rescaled risk scores.

In some arrangements, the first distribution function of rescaled risk score is a gamma distribution function, and the second distribution function of rescaled risk score is proportional to a generalized Pareto distribution function, wherein the gamma distribution function has a shape parameter and a scale parameter and the generalized Pareto distribution function has a shape parameter, a scale parameter, and a location parameter, the location parameter being the cutoff parameter, and generating the log-likelihood function includes normalizing the generalized Pareto distribution function to cause the distribution function of risk score to be equal to one for risk scores sufficiently greater than the risk score threshold.

In some arrangements, the method further includes generating a normalization table having a set of entries, each of the set of entries including (i) a normalized risk score corresponding to a specified percentile of a set of specified percentiles and (ii) a risk score coordinate of a point along the standard distribution curve which represents the specified percentile and normalizing the first new risk score and the second new risk score according to the normalization table.

In some arrangements, the method further includes, after producing the new risk score, including the first new risk score and the second new risk score in the remaining risk scores and, after including the first new risk score and the second new risk score in the remaining risk scores, performing the mathematical estimation operation to derive a new risk score threshold from the remaining risk scores.

Other embodiments of the improvement are directed to electronic systems and apparatus, processing circuits, computer program products, and so on. Some embodiments are directed to various methods, electronic components and circuitry that are involved in performing authentication.

It should be understood that, in the cloud context, electronic circuitry is formed by remote computer resources distributed over a network. Such an electronic environment is capable of providing certain advantages such as high availability and data protection, transparent operation and enhanced security, big data analysis, etc.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improvement to conventional adaptive authentication involves performing a mathematical estimation operation to identify a risk score threshold. Advantageously, the improvement provides robust authentication even when the number of risk scores collected over a period of time is small.

Figure 1:
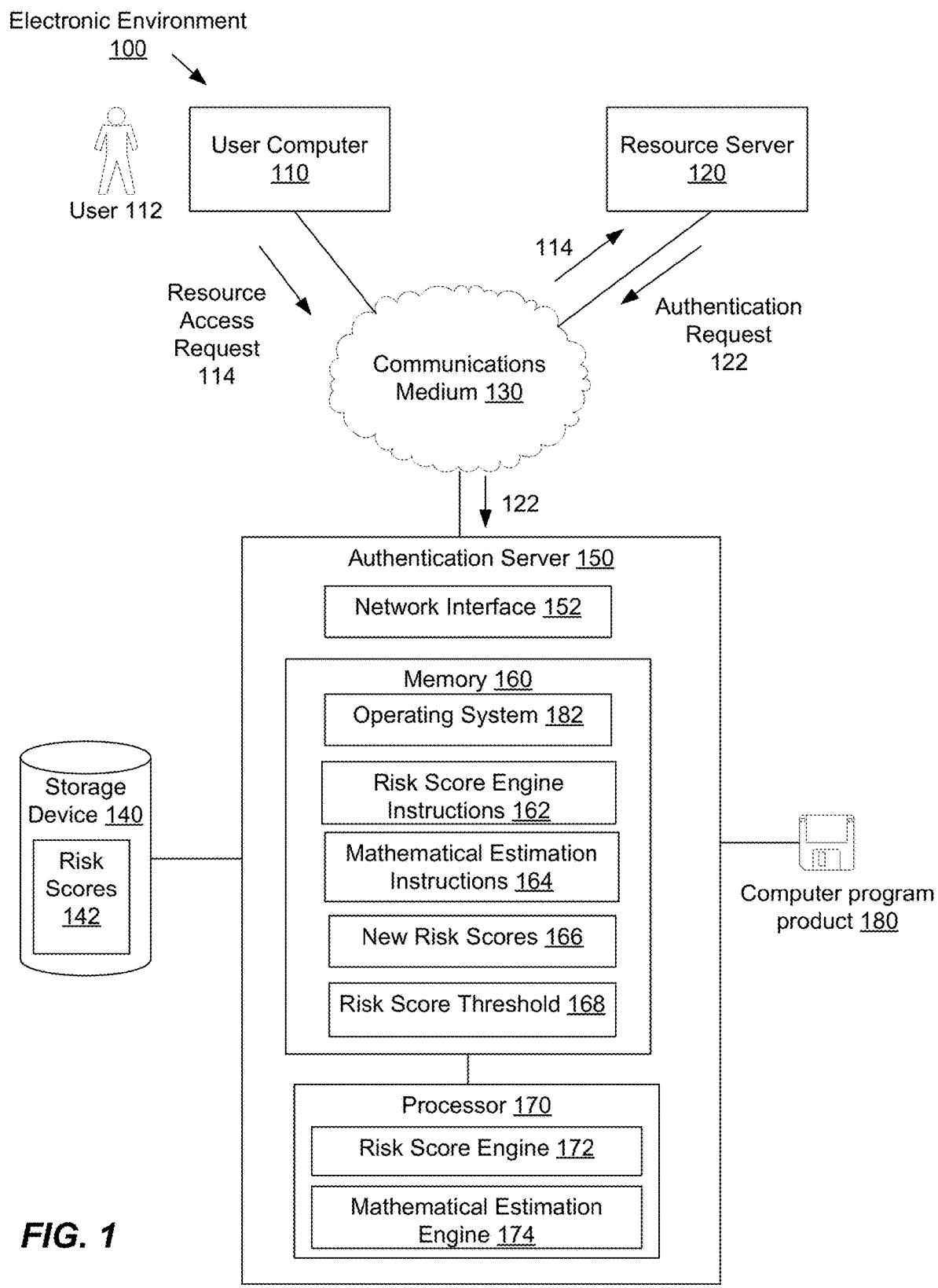
FIG. 1 is a block diagram illustrating an example electronic environment in which the improvement can be carried out.

FIG. 1 shows an example electronic environment 100 that is suitable for carrying out the improvement. The electronic environment 100 includes a user computer 110, a resource server device 120, a communications medium 130, a storage device 140, and an authentication server device 150.

User computer 110 may be any electronic device (e.g., personal computer, laptop, smartphone, tablet, or the like) constructed and arranged to generate a resource access request 114 in response to input from user 112. Typically, user computer 110 is configured to run an Internet browser that causes user computer 110 to generate resource access request 114 in response to user input (e.g., submission of login credentials). For example, resource access request 114 may take the form of a request to access a bank account.

Resource server device 120 is typically an enterprise-level server device that is constructed and arranged to host resources to which user 112 desires access. For example, resource server device 120 may host a web site for a bank having an account to which user 112 desires access. Resource server device 120 is configured to generate an authentication request 122 in response to receipt of resource access request 114 over communications medium 130. Authentication request 122 is a set of data packets containing values of authentication factors, e.g., geolocation, time of request, transaction amount, etc.

Communications medium 130 is constructed and arranged to connect the various components of the electronic environment 100 together to enable these components to exchange data packets such as resource access request 114 and authentication request 122. At least a portion of the communications medium 130 is illustrated as a cloud to indicate that the communications medium 130 is capable of having a variety of different topologies including backbone, hub-and-spoke, loop, irregular, combinations thereof, and so on. Along these lines, the communications medium 130 may include copper-based data communications devices and cabling, fiber optic devices and cabling, wireless devices, combinations thereof, etc. Furthermore, the communications medium 130 is capable of supporting LAN-based communications, SAN-based communications, cellular communications, combinations thereof, etc.

Storage device 140 is configured to store risk scores 142 generated over a first period of time in response to authentication requests such as authentication request 122. As shown in FIG. 1, storage device 140 is external to authentication server device 150, although in some arrangements, storage device 140 may be located within authentication server device 150.

Authentication server device 150 is an enterprise-level server device that is constructed and arranged to compute risk scores in response to authentication requests. Authentication server device 150 includes a network interface 152, memory 160, and processing circuitry 170. The architecture and/or form factor of authentication server device 150 may be that of a workstation, a general purpose computer, combinations thereof, etc.

The network interface 152 is constructed and arranged to connect authentication server device 150 to communications medium 130. Accordingly, network interface 152 enables authentication server device 150 to communicate with the other components of electronic environment 100. Such communications may be copper-based or wireless (i.e., IP-based, SAN-based, cellular, Bluetooth, combinations thereof, and so on).

Memory 160 is intended to represent both volatile storage (e.g., DRAM, SRAM, etc.) and non-volatile storage (e.g., flash memory, magnetic disk drives, etc.). Memory 160 stores a variety of software constructs including an operating system 182, a risk score engine application 162, and a mathematical estimation application 164. In some arrangements, the mathematical estimation application 164 is part of the risk engine application 162. Memory 160 further stores data including new risk scores 166 and a risk score threshold 168.

Processing circuitry 170 is constructed and arranged to operate in accordance with the various software constructs stored in the memory 160. In particular, processing circuitry 170, when executing the operating system 182, manages various resources of the authentication server device 150 (e.g., memory allocation, processor cycles, etc.). Additionally, the processing circuitry 170 executing the risk score engine application 162 and the mathematical estimation application 164 forms specialized circuitry 172 and 174, respectively, which performs adaptive authentication. In some arrangements, circuitry 174 is part of circuitry 172. Furthermore, such control circuitry is able to access risk scores 142 in storage device 140 in the course of executing mathematical estimation application 164.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 180 is capable of delivering all or portions of the software to the authentication server device 150. The computer program product 180 has a non-transitory and non-volatile computer readable medium which stores a set of instructions to control one or more operations of the authentication server device 150. Examples of suitable computer readable storage media include tangible articles of manufacture and apparatus which store instructions in a non-volatile manner such as CD-ROM, flash memory, disk memory, tape memory, and the like.

During an example operation, processor 170 collects risk scores 142 that had been generated over a first time period, e.g., one week, although shorter or longer time periods are possible. Risk scores 142 were generated by specialized circuitry, i.e., risk score engine 172, in response to authentication requests received during the first time period. For example, risk score engine 172 applied a Bayesian weight to each of the authentication factors according to the influence that authentication factor had on the likelihood of fraud during the first time period.

Specialized circuitry, i.e., mathematical estimation engine 174, then performs a mathematical estimation operation to derive risk score threshold 168 from the collected risk scores 142 and stores risk score threshold in memory 160. While details of the mathematical estimation operation will be provided in connection with FIGS. 2 and 3, it should be understood that the risk score threshold 168 so derived from the collected risk scores 142 is not necessarily, or even at all likely, equal to any of the collected risk scores 142. For example, mathematical estimation engine 174 may derive risk score threshold 168 by finding a risk score at which a model distribution of risk scores is equal to a specified percentile.

After risk score threshold 168 has been derived, during a second time period, processor 170 authenticates user 112 based on risk score threshold 168 stored in memory 160. For example, resource server device 120 generates authentication request 122 containing values of authentication factors gleaned from resource access request 114 generated in response to user 112 submitting, e.g., login credentials and sends authentication request 122 to authentication server device 150 via communications medium 130. Upon receipt of authentication request 122 by network interface 152 of authentication server device 150, risk score engine 172 performs a risk score computation using the values of the authentication factors contained in authentication request 122 to produce a new risk score 166. Risk score engine 172 then compares new risk score 166 to risk score threshold 168.

In some arrangements, authentication server device 150 may invoke an action specified in an authentication policy when new risk score 166 is greater than risk score threshold 168. For example, when new risk score 166 is greater than risk score threshold 168, authentication server device 150 may request values of additional authentication factors from user 112.

Figure 2:
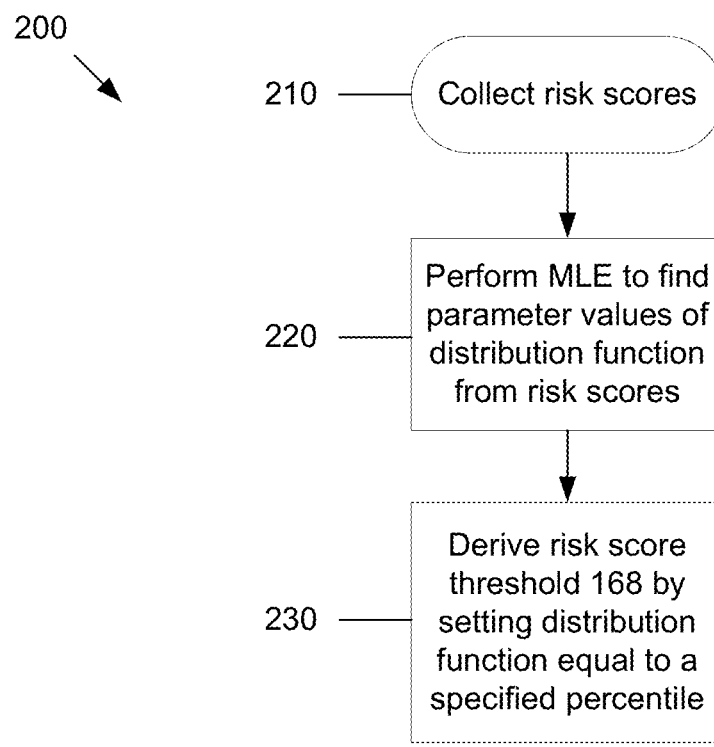
FIG. 2 is a flow chart illustrating an example authentication performed within the electronic environment shown in FIG. 1.

FIG. 2 illustrates further details of an example mathematical estimation operation 200. Mathematical estimation operation 200 involves an application of a parametric model of the distribution of risk scores 142. In mathematical language, a parametric distribution model takes the form $F(x|\alpha_1, \alpha_2, \ldots, \alpha_N)$, where x represents a risk score and $\alpha_1, \alpha_2, \ldots, \alpha_N$ represents values of N parameters.

It should be understood that the model F simulates a standard distribution curve within a graphical plot of risk score percentile versus risk score, i.e., a cumulative distribution. The choice of model F represents an understanding of a risk environment that produces risk scores over any period of time. Parameter values $\alpha_1, \alpha_2, \ldots, \alpha_N$ define the particular instance of the model F that describes a collection of risk scores computed over a period of time. Thus, while the parameter values $\alpha_1, \alpha_2, \ldots, \alpha_N$ may change between different collections of risk scores, the model F does not change.

It should further be understood that mathematical estimation engine 174 uses the model F to estimate, rather than exactly determine, the risk score threshold 168 from the risk scores 142. Such an estimation stands in contrast to a selection of one of the risk scores 142 as a threshold because the risk score threshold 168 resulting from the mathematical estimation operation 200 is almost always not equal to any of the risk scores 142. This aspect of the estimation is not a reflection of numerical accuracy but rather the limitations imposed by the inexactness of the model F and the finite amount of risk score data used to determine the parameter values $\alpha_1, \alpha_2, \ldots, \alpha_N$. Nevertheless, when there is confidence that the model F accurately describes the distribution of risk scores computed over a period of time, then an estimate of the risk score threshold 168 is accurate even when there are relatively few risk score data points.

Once mathematical estimation engine 174 collects risk scores 142 at 210, mathematical estimation engine 174 at 220 applies an algorithm that finds specific parameter values $\hat{\alpha}_1, \hat{\alpha}_2, \ldots, \hat{\alpha}_N$ representing a best estimate of the distribution of risk scores 142. In mathematical estimation operation 200, the algorithm is the maximum likelihood estimation (MLE). However, in some arrangements, a different algorithm may be used, e.g., method of moments, method of cumulants, and the like.

MLE involves defining a likelihood function as follows:

$$L(x_1, x_2, \ldots, x_n | \alpha_1, \alpha_2, \ldots, \alpha_N) = \prod_{i=1}^{n} f(x_i | \alpha_1, \alpha_2, \ldots, \alpha_N) \quad (1)$$

where $$f(x|\alpha_1, \alpha_2, \ldots, \alpha_N) = F'(x|\alpha_1, \alpha_2, \ldots, \alpha_N) \quad (2)$$

is the derivative of the parametric distribution model F with respect to risk score x, i.e., a probability distribution function, and the $x_1, x_2, \ldots, x_n$ are the risk scores 142. To simplify any further calculation, the MLE in many cases works from the logarithm of the likelihood function:

$$\ln[L(x_1, x_2, \ldots, x_n | \alpha_1, \alpha_2, \ldots, \alpha_N)] = \quad (3)$$
$$\sum_{i=1}^{n} \ln[f(x_i | \alpha_1, \alpha_2, \ldots, \alpha_N)].$$

It should be understood that the $x_1, x_2, \ldots, x_n$ are known risk scores, while the parameter values $\alpha_1, \alpha_2, \ldots, \alpha_N$ are output as a result of performing MLE.

MLE involves finding specific parameter values $\hat{\alpha}_1, \hat{\alpha}_2, \ldots, \hat{\alpha}_N$ by maximizing the logarithm of the likelihood function over all possible parameter values $\alpha_1, \alpha_2, \ldots, \alpha_N$. It should be understood that maximizing the logarithm of the likelihood function is equivalent to maximizing the likelihood function itself because the logarithm is a monotonically increasing function. The MLE involves maximizing the logarithm because the logarithm provides a simpler maximization procedure.

In some arrangements, the parametric distribution function is a mixture of two distribution functions as follows:

$$F(x | \alpha_1, \alpha_2, \ldots, \alpha_N) = \begin{cases} F_1(x | \alpha_1, \alpha_2, \ldots, \alpha_M) & x < \alpha_N \\ F_2(x | \alpha_{M+1}, \alpha_{M+2}, \ldots, \alpha_N) & x \geq \alpha_N \end{cases} \quad (4)$$

The parameter $\alpha_N$ will be referred to as a cutoff risk score. In this case, the logarithm of the likelihood function becomes $$\ln[L(x_1, x_2, \ldots, x_n | \alpha_1, \alpha_2, \ldots, \alpha_N)] = \quad (5)$$
$$\sum_{i=1}^{m} \ln[f_1(x_i | \alpha_1, \alpha_2, \ldots, \alpha_M)] +$$
$$\sum_{i=m+1}^{n} \ln[f_2(x_i | \alpha_{M+1}, \alpha_{M+2}, \ldots, \alpha_N)]$$

where $x_m < \alpha_N \leq x_{m+1}$.

Once the mathematical estimation engine 174 finds parameter values $\hat{\alpha}_1, \hat{\alpha}_2, \ldots, \hat{\alpha}_N$ by, e.g., MLE as described above, mathematical estimation engine 174 at 230 derives risk score threshold 168 from the distribution model $F(x|\alpha_1, \alpha_2, \ldots, \alpha_N)$ and a specified percentile. Specifically, if the specified percentile is a number P between zero and one, then the risk score threshold 168, $x_{th}$, is found by solving $$F(x_{th}|\hat{\alpha}_1, \hat{\alpha}_2, \ldots, \hat{\alpha}_N) = P, \quad (6)$$

where, again, $\hat{\alpha}_1, \hat{\alpha}_2, \ldots, \hat{\alpha}_N$ are the parameter values that maximize the logarithm of the likelihood function.

Figure 3:
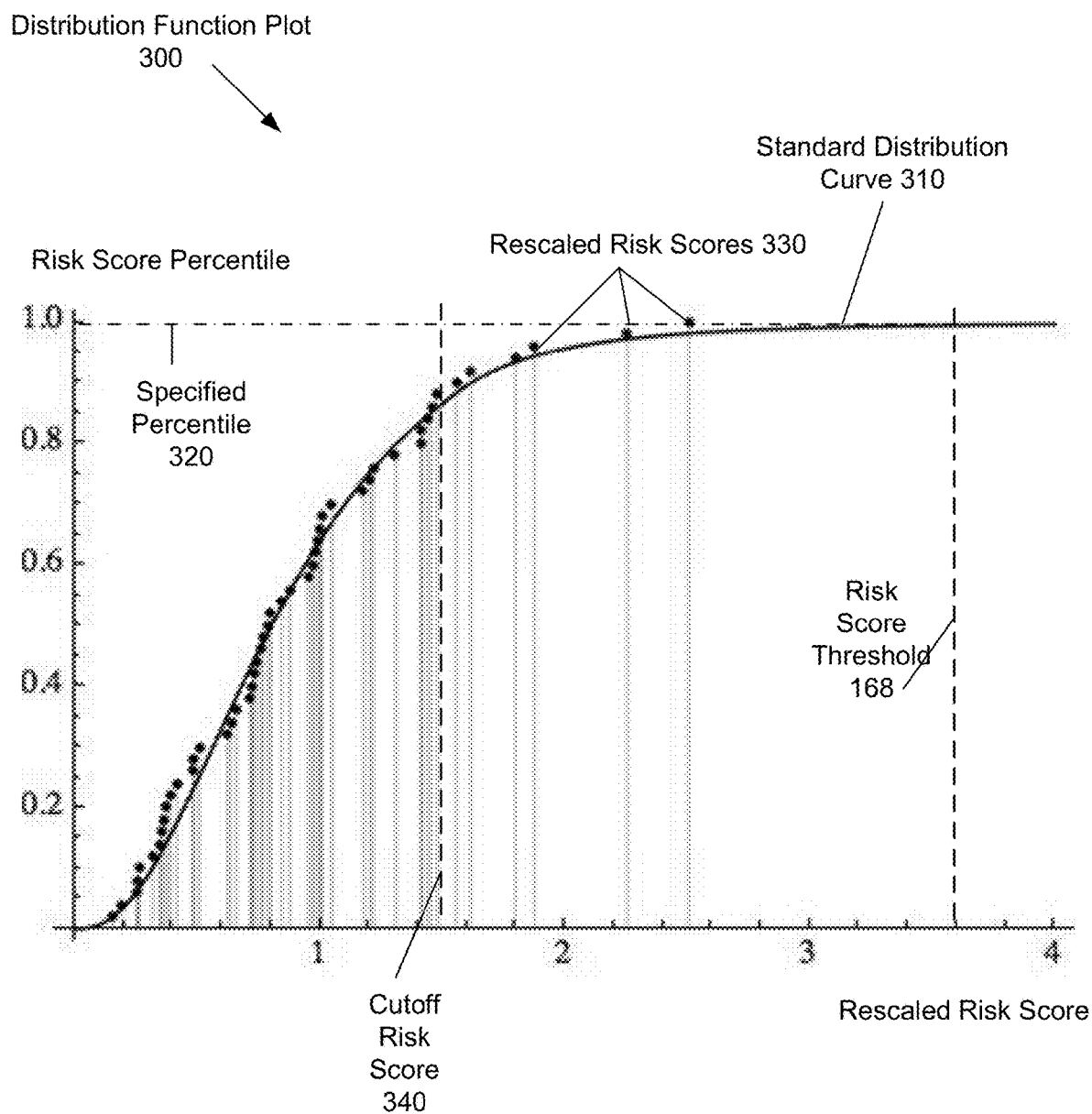
FIG. 3 is a graph illustrating an example result of a mathematical estimation operation performed within the electronic environment shown in FIG. 1.

FIG. 3 illustrates a distribution function plot 300 representing a specific case of a parametric distribution model that has been determined to accurately describe distributions of risk scores. This distribution function is a mixture distribution as follows:

$$F(x | k, \theta, \xi, \sigma_u, u) = \quad (7)$$
$$\begin{cases} \gamma(k, \theta, x) & x < u \\ \gamma(k, \theta, u) + [1 - \gamma(k, \theta, u)] \times [1 - (1 + \xi z)^{1/\xi}] & x \geq u, \xi \neq 0 \\ \gamma(k, \theta, u) + [1 - \gamma(k, \theta, u)] \times [1 - \exp(-z)] & x \geq u, \xi = 0 \end{cases}$$

where $$\gamma(k, \theta, x) = \frac{1}{\Gamma(k)} \int_0^x \theta^{-k} t^{k-1} e^{-t/\theta} dt, \quad (8)$$

$$z = \frac{x-u}{\sigma_u}, \quad (9)$$

and $\sigma_u>0$, $k>0$, $\theta>0$, $\xi \geq 0$. That is, when $x<u$, F is a gamma distribution function and when $x \geq u$, F is a generalized Pareto distribution function. It should be understood that F is scaled to ensure that (i) F is continuous at $x=u$ and (ii)

$$\lim_{x \to \infty} F(x \mid k, \theta, \xi, \sigma_u, u) = 1.$$

k and $\xi$ are known as shape parameters of the gamma and Pareto distributions, respectively, while $\theta$ and $\sigma_u$ are known as scale parameters of the gamma and Pareto distributions, respectively. u is simultaneously a location parameter of the Pareto distribution and the cutoff parameter of the mixture distribution.

FIG. 3 shows example, resealed risk scores 330 within plot 300. It should be understood that mathematical estimation engine 174 rescales raw risk scores 142 as follows.

Mathematical estimation engine 174 subtracts the minimum risk score from risk scores 142 to produce non-negative, shifted risk scores. (Thus, the minimum shifted risk score is zero.)

Mathematical estimation engine 174 divides the shifted risk scores by the interquartile range of risk scores 142 to produce resealed risk scores 330.

It should be understood that resealed risk scores 330 are resealed by an interquartile range rather than an entire range so as to reduce sensitivity of the resealing to outliers.

Also shown within plot 300 is a standard distribution curve 310 described by Eqs. (7), (8), and (9). Mathematical estimation engine 174 determines curve 310 by performing a MLE using resealed risk scores 330 and Eqs. (7), (8), and (9). Specifically, mathematical estimation engine 174 maximizes the quantity $$\ln L(x \mid k, \theta, \xi, \sigma_u, u) = \begin{cases} f_1 + f_2 - \sum_B \left\{ \frac{(1+\xi)}{\xi} \ln[1 + \xi z_i] \right\} & \xi \neq 0 \\ f_1 + f_2 + \sum_B z_f & \xi = 0 \end{cases} \quad (10)$$

where $$f_1 = \sum_A \left( -k \ln \theta + (k-1) \ln x_i - \frac{x_i}{\theta} \right), A = \{i : x_i < u\} \quad (11)$$

$$f_2 = \sum_B \{\ln[1 - \gamma(k, \theta, u)] - \ln \sigma_u\}, B = \{i : x_i \geq u\}$$

In this case, the parameter values found after performing MLE are $k \approx 2.8$, $\theta \approx 0.33$, $\xi \approx 0.30$, $\sigma_u \approx 0.37$, and $u \approx 1.5$. It should be understood that plot 300 demarcates the cutoff risk score 340 according to this value of u.

Once mathematical estimation engine 174 determines the shape of the curve 310 by finding the parameter values via MLE, mathematical estimation engine 174 may then estimate the risk score threshold from a specified percentile 320 and curve 310 using Eq. (6). In the case illustrated in FIG. 3, specified percentile 320 is 0.995, and threshold (rescaled) risk score 330 is $x_{th} \approx 3.6$.

From curve 310, mathematical estimation engine 174 may also create a normalization table from which new risk scores may be normalized. Normalization of new risk scores allows for a comparison of the new risks scores to those computed over a previous time period (e.g., a week).

Figure 4:
FIG. 4 is a chart illustrating an example normalization table computed according to the result shown in FIG. 3.

FIG. 4 illustrates a normalization table 400. Normalization table 400 contains a percentile field 410, a normalized risk score field 420, a rescaled risk score field 430, and a raw risk score field 440. Each entry of table 400 provides a mapping between a normalized risk score 420, a percentile 410, and a raw risk score 440.

Mathematical estimation engine 174 builds normalization table 400 by using Eq. (6) to solve for rescaled risk scores 430 given percentiles 410. For example, using the curve 310 (FIG. 3), mathematical estimation engine 174 determines that the $50^{th}$ percentile, or a normalized risk score 420 of 100, is reached at a rescaled risk score 420 of about 0.80. By multiplying the rescaled risk score 420 by the interquartile range of the raw risk scores and adding the minimum risk score, mathematical estimation engine 174 determines the raw risk score 440 to be 166. Mathematical estimation engine 174 may repeat this procedure over as many percentiles as needed in normalization table 400.

When risk score engine 172 computes a new risk score, mathematical estimation engine 174 normalizes the new risk score using normalization table 400. Assuming that risk score engine 172 has not significantly changed its computation methodology (e.g., Bayesian coefficient values), mathematical estimation engine 174 may simply place a raw risk score within normalization table 400 to produce a new normalized risk score. As authentication policies may depend on normalized risk scores 420, normalization table 400 provides for fast, robust decision making in terms of what actions specified by an authentication policy to take in response to a new raw risk score.

Figure 5:
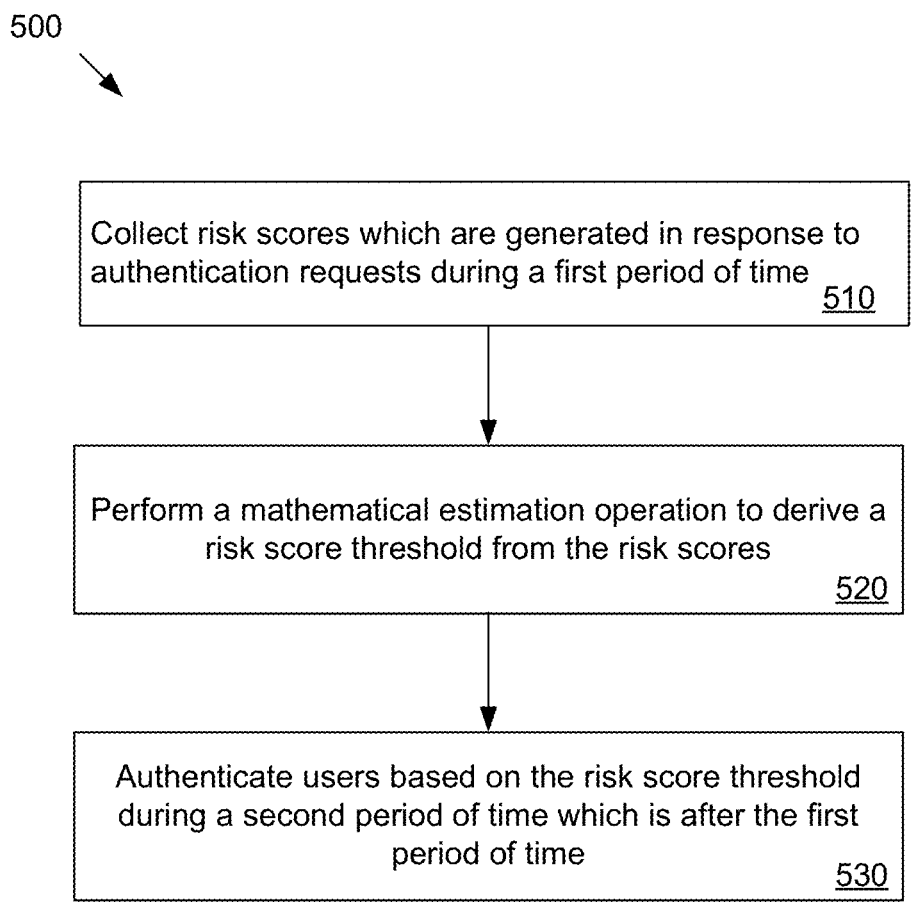
FIG. 5 is a flow chart illustrating an example method for carrying out the improvement.

FIG. 5 is a flowchart of a procedure 500 which is performed by the electronic environment 100 to perform authentication. At 510, authentication server device 150 collects risk scores, e.g., risk scores 142 which are generated in response to authentication requests during a first period of time, e.g., the previous week. At 520, authentication server device 150 performs a mathematical estimation operation, e.g., MLE, to derive a risk score threshold, e.g., risk score threshold 168, from the risk scores. At 530, authentication server device 150 authenticates users, e.g., user 112, based on the risk score threshold during a second period of time, e.g., the current day, which is after the first period of time.

As described above, an improvement to conventional adaptive authentication involves performing a mathematical estimation operation to identify a risk score threshold. In the example described above, the mathematical estimation operation involved finding parameters of a standard distribution function that best represented risk score data taken over, e.g., a week. It should be appreciated that the standard distribution function applies to all risk score data; only the parameters change between different datasets. The determination of such a distribution function involved analyzing many risk score datasets in order to glean a universal behavior. In possessing such a parametric function, risk scores may now be analyzed even when risk score history is sparse.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that risk scores 142 may represent only a subset of risk scores taken over a first time period. For example, separate analyses may be performed for risk scores within different partitions of, e.g., client, communication channel, event type, user defined event type, and the like.

Such modifications and enhancements are intended to belong to various embodiments of the disclosure.

What is claimed is:

1. A method of selectively providing access to users who have correctly identified themselves, the method comprising:
   (a) during a first time interval:
      receiving, by a resource server, a plurality of resource access requests from user devices over a network,
      in response to each of the received plurality of resource access requests, generating a respective authentication request based on values of authentication factors from that resource access request and sending that authentication request from the resource server to an authentication server over the network,
      generating, by processing circuitry of the authentication server, a plurality of risk scores in response to receiving the authentication requests;
   (b) deriving, by the processing circuitry, a risk score threshold from the risk scores by:
      generating a fitted parametric distribution function of risk score percentile versus risk score by fitting the risk scores to a model of a parametric distribution function,
      identifying a point along the fitted parametric distribution function having a first coordinate equal to a threshold risk score percentile and a second coordinate that is not found among the risk scores generated by the processing circuitry during the first time interval, and
      determining the risk score threshold to be equal to the second coordinate; and
   (c) during a second time interval subsequent to the first time interval:
      receiving, by the resource server from a first user device over the network, a first resource access request to access a first protected account hosted by the resource server,
      in response to the resource server receiving the first resource access request, generating a first authentication request based on the first resource access request and sending the first authentication request from the resource server to the authentication server over the network, the first authentication request containing first values of authentication factors,
      receiving, by the resource server from a second user device over the network, a second resource access request to access a second protected account hosted by the resource server,
      in response to the resource server receiving the second resource access request, generating a second authentication request based on the second resource access request and sending the second authentication request from the resource server to the authentication server over the network, the second authentication request containing second values of authentication factors,
      generating, by the processing circuitry, a first risk score based on the first values of the authentication factors of the first authentication request and a second risk score based on the second values of the authentication factors of the second authentication request;
      determining, by the processing circuitry, that the first risk score is less than the derived risk score threshold, and, in response, providing the first user device with access to the first protected account; and
      determining, by the processing circuitry, that the second risk score is greater than the derived risk score threshold, and, in response, invoking an action prior to providing or denying the access to the second protected account to the second user device, wherein invoking the action includes:
         requesting additional authentication factors from the second user device; and
         performing follow-up authentication based on the additional authentication factors prior to determining whether the second user device may access the second resource.

2. A method as in claim 1, wherein the model of the parametric distribution function includes a variable set of parameters; and
   wherein fitting the risk scores to the model includes finding a particular value of each of the set of parameters based on the risk scores.

3. A method as in claim 2, wherein fitting the risk scores to the model further includes rescaling the risk scores to respective nonnegative rescaled risk scores; and
   wherein finding the particular value of each of the set of parameters using the risk scores includes performing a maximum likelihood estimation of the set of parameters using the rescaled risk scores.

4. A method as in claim 3, wherein rescaling the risk scores includes:
   generating an interquartile range of the risk scores; and
   dividing each of the risk scores by the interquartile range in order to avoid scaling the risk scores by outliers.

5. A method as in claim 3, wherein the fitted parametric distribution function is equal to a first distribution function of rescaled risk score when a rescaled risk score is less than a value of a cutoff parameter of the set of parameters and a second distribution function of rescaled risk score when the rescaled risk score is greater than the value of the cutoff parameter, the second distribution function representing a tail of a distribution of the rescaled risk scores; and wherein performing the maximum likelihood estimation of the set of parameters using the rescaled risk scores includes generating a log-likelihood function of the set of parameters from the first distribution function, the second distribution function, and the rescaled risk scores.

6. A method as in claim 5, wherein the first distribution function of rescaled risk score is a gamma distribution function, and the second distribution function of rescaled risk score is proportional to a generalized Pareto distribution function;
    wherein the gamma distribution function has a gamma shape parameter, k, and a gamma scale parameter, $\theta$;
    wherein the generalized Pareto distribution function has a Pareto shape parameter, $\xi$, a Pareto scale parameter, $\sigma_u$, and a location parameter, u;
    wherein the method further comprises setting the cutoff parameter to be equal to the location parameter, u; and
    wherein generating the log-likelihood function includes normalizing the generalized Pareto distribution function to cause the distribution function of risk score to be equal to one for risk scores sufficiently greater than the risk score threshold.

7. A system constructed and arranged to selectively provide access to users who have correctly identified themselves, the system comprising:
    a resource server including first controlling circuitry coupled to first memory; and
    an authentication server including second controlling circuitry coupled to second memory;
    wherein the first memory stores first instructions, which, when executed by the first controlling circuitry, cause the resource server to, during a first time interval:
        receive a plurality of resource access requests from user devices over a network and
        in response to each of the received plurality of resource access requests, generate a respective authentication request based on values of authentication factors from that resource access request and send that authentication request to the authentication server over the network;
    wherein the second memory stores second instructions, which, when executed by the second controlling circuitry cause the authentication server to:
        during the first time interval, generate a plurality of risk scores in response to receiving the authentication requests and
        derive a risk score threshold from the risk scores by:
            generating a fitted parametric distribution function of risk score percentile versus risk score by fitting the risk scores to a model of a parametric distribution function,
            identifying a point along the fitted parametric distribution function having a first coordinate equal to a threshold risk score percentile and a second coordinate that is not found among the risk scores generated by the authentication server during the first time interval, and
            determining the risk score threshold to be equal to the second coordinate;
    wherein the first instructions, when executed by the first controlling circuitry, further cause the resource server to, during a second time interval subsequent to the first time interval:
        receive from a first user device over the network, a first resource access request to access a first protected account hosted by the resource server,
        in response to the resource server receiving the first resource access request, generate a first authentication request based on the first resource access request and send the first authentication request to the authentication server over the network, the first authentication request containing first values of authentication factors,
        receive from a second user device over the network, a second resource access request to access a second protected account hosted by the resource server, and
        in response to the resource server receiving the second resource access request, generate a second authentication request based on the second resource access request and send the second authentication request from the resource server to the authentication server over the network, the second authentication request containing second values of authentication factors; and
    wherein the second instructions, when executed by the second controlling circuitry, further cause the authentication server to, during the second time interval subsequent to the first time interval:
        generate a first risk score based on the first values of the authentication factors of the first authentication request and a second risk score based on the second values of the authentication factors of the second authentication request;
        determine that the first risk score is less than the derived risk score threshold, and, in response, provide the first user device with access to the first protected account; and
        determine that the second risk score is greater than the derived risk score threshold, and, in response, invoke an action prior to providing or denying the access to the second protected account to the second user device, wherein invoking the action includes:
            requesting additional authentication factors from the second user device; and
            performing follow-up authentication based on the additional authentication factors prior to determining whether the second user device may access the second resource.

8. A system as in claim 7, wherein the model of the parametric distribution function includes a variable set of parameters; and
    wherein the second instructions, when executed by the second controlling circuitry, when fitting the risk scores to the model, further cause the authentication server to find a particular value of each of the set of parameters based on the risk scores.

9. A system as in claim 8, wherein the second instructions, when executed by the second controlling circuitry, when fitting the risk scores to the model, further cause the authentication server to rescale the risk scores to respective non-negative rescaled risk scores; and
    wherein the second instructions, when executed by the second controlling circuitry, when finding the particular value of each of the set of parameters using the risk scores, further cause the authentication server to perform a maximum likelihood estimation of the set of parameters using the rescaled risk scores.

10. A system as in claim 9, wherein the second instructions, when executed by the second controlling circuitry, when rescaling the risk scores, further cause the authentication server to:

generate an interquartile range of the risk scores; and
divide each of the risk scores by the interquartile range in order to avoid scaling the risk scores by outliers.

11. A system as in claim 9, wherein the fitted parametric distribution function is equal to a first distribution function of rescaled risk score when a rescaled risk score is less than a value of a cutoff parameter of the set of parameters and a second distribution function of rescaled risk score when the rescaled risk score is greater than the value of the cutoff parameter, the second distribution function representing a tail of a distribution of the rescaled risk scores; and
  wherein the second instructions, when executed by the second controlling circuitry, when performing the maximum likelihood estimation of the set of parameters using the rescaled risk scores, further cause the authentication server to generate a log-likelihood function of the set of parameters from the first distribution function, the second distribution function, and the rescaled risk scores.

12. A system as in claim 11, wherein the first distribution function of rescaled risk score is a gamma distribution function, and the second distribution function of rescaled risk score is proportional to a generalized Pareto distribution function;
  wherein the gamma distribution function has a gamma shape parameter, k, and a gamma scale parameter, $\theta$;
  wherein the generalized Pareto distribution function has a Pareto shape parameter, $\xi$, a Pareto scale parameter, $\sigma_u$, and a location parameter, u;
  wherein the second instructions, when executed by the second controlling circuitry, further cause the authentication server to set the cutoff parameter to be equal to the location parameter, u; and
  wherein the second instructions, when executed by the second controlling circuitry, when generating the log-likelihood function, further cause the authentication server to normalize the generalized Pareto distribution function to cause the distribution function of risk score to be equal to one for risk scores sufficiently greater than the risk score threshold.

* * * * *